United States Patent [19]

Runte et al.

[11] 4,116,441
[45] Sep. 26, 1978

[54] MOVING GOALIE CIRCUIT FOR A MANUALLY CONTROLLED ELECTRONIC VIDEO GAME

[75] Inventors: Robert Ralph Runte, 912 Sandborn, Palatine, Ill. 60067; Theodore A. Mau, Chicago, Ill.

[73] Assignee: Robert Ralph Runte, Palatine, Ill.

[21] Appl. No.: 736,938

[22] Filed: Oct. 29, 1976

[51] Int. Cl.² ............................................. A63F 7/06
[52] U.S. Cl. .......................... 273/85 G; 273/DIG. 28
[58] Field of Search ............ 273/1 E, 85 R, DIG. 28, 273/85; 331/107 R, 108 C, 113 C, 107, 108, 111, 113, 143; 340/324 A, 324 AD, 323 R, 324, 323

[56] References Cited

U.S. PATENT DOCUMENTS

| | | | |
|---|---|---|---|
| 3,474,438 | 10/1969 | Lauher | 340/324 A |
| 3,602,644 | 8/1971 | Rognon et al. | 340/324 AD X |
| 3,659,284 | 4/1972 | Rusch | 273/DIG. 28 |
| 3,659,285 | 4/1972 | Baer et al. | 273/DIG. 28 |
| 3,728,480 | 4/1973 | Baer | 273/1 E X |
| 3,778,058 | 12/1973 | Rausch | 273/DIG. 28 |
| 3,793,483 | 2/1974 | Bushnell | 273/DIG. 28 |
| 3,874,669 | 4/1975 | Ariano et al. | 273/85 R |

OTHER PUBLICATIONS

*Electronics Australia;* "Build Your Own Home TV Game"; Feb., 1976; pp. 42-45.
Hnatek, E. R.; *Applications of Linear Integrated Circuits;* John Wiley & Sons; 1975; pp. 163-166.
*Popular Electronics;* "TV Electronic Game Projects"; Apr., 1976; pp. 35-45.

*Primary Examiner*—Vance Y. Hum
*Attorney, Agent, or Firm*—Anthony S. Zummer

[57] ABSTRACT

A moving goalie circuit is disclosed herein. The moving goalie circuit includes a first operational amplifier, having a linear feedback. A second operational amplifier is connected to the first operational amplifier. The second operational amplifier is an integrator. A relay is connected to the output of the second operational amplifier. The relay is selectively connectable to a timer for controlling position of a cursor or goalie image on a video screen. The first and second operational amplifiers produce a triangular wave which causes the timer to sweep repetitively the goalie image back and forth across a playing screen.

11 Claims, 3 Drawing Figures

MOVING GOALIE CIRCUIT FOR A MANUALLY CONTROLLED ELECTRONIC VIDEO GAME

BACKGROUND OF THE INVENTION

Manual play electronic visual games are well-known in the art. Representative disclosures of typical electronic visual games, and associated display circuitry, can be found in U.S. Pat. No. 3,631,457 to Hamada, et al.; U.S. Pat. No. 3,659,284 to Rusch; U.S. Pat. No. 3,659,285 to Baer, et al.; and U.S. Pat. No. 3,793,483 to Bushnell. The typical manual play electronic visual game is of the hockey type or a paddle type game sold under the trademark "PING-PONG". The game is adapted to be played by a pair of players. Each player has a control unit, which he can use to control a cursor or paddle image, which is movable on a television or cathode ray screen. The cursor usually can be controlled in a single direction of movement only (for instance, up and down). The game circuitry also generates a puck or ball image, commonly a small square, which moves across the screen or "playing field". The circuitry which controls the ball calculates angles of incidence and reflection to duplicate as closely as possible conditions under which an actual game might be played. The players are able to move their paddles along a single direction in order to deflect the moving square back into the other player's field of play. Normally, if the moving square and the cursor of a particular player do not intersect, the moving square moves behind the cursor; and a point is scored in favor of the opposite player. Thus, games similar to tennis, Ping-Pong or volleyball can be played.

Other more complicated games involve games somewhat similar to hockey in that they involve making a shot in a particular specified goal area in order to accure points. In these types of games, each of the players commonly controls a forward cursor and a number of rear cursors, which can act as blocking cursors. However, the basic principles of the game remain the same.

Oftentimes, a person wishes to play an electronic visual game and cannot find another person who is willing to play with him. The player, of course, can choose to manipulate both controls and thereby play both sides of the game himself, but this is often an uninteresting game and the player may soon tire of this game.

It is, therefore, desirable if the electronic visual game has some facility to enable a person to play against the game itself. For instance, a rapidly moving goalie, moving back and forth in front of a goal mouth which starts at unpredictable positions when the ball image is served, may provide a challenge to a player so that he would enjoy playing against the game itself.

What is needed then, is a circuit which would generate control signals to generate a moving goalie, or paddle image, passing in front of a goal mouth.

SUMMARY OF THE INVENTION

A circuit for generating a control signal to cause a paddle image to act as a moving goalie, is disclosed herein. A first operational amplifier is connected to a constant source of potential. A resistance is connected between the constant potential source and an inverting input terminal of the first operational amplifier. A second resistance is connected from an output terminal of the first operational amplifier to a input terminal of the operational amplifier in feedback fashion. A second operational amplifier is connected to the first operational amplifier. The second operational amplifier has a capacitance connected in feedback with the second operational amplifier to render the second operational amplifier an integrating amplifier. A resistor is connected in feedback from an output terminal of the second operational amplifier to a non-inverting input terminal of the first operational amplifier. A relay is connected to the output of the second operational amplifier. The relay, when activated in one position, connects an external potentiometer to a model 555 integrated circuit timer. In a second position, the relay connects the ganged operational amplifiers to the model 555 timer. The 555 timer also receives a vertical synchronizing pulse from other portions of the game.

In operation, the paired operational amplifiers generate a triangular wave form. The operational amplifiers act as a free-running oscillator. The symmetrical triangular wave form is then fed through the relay to the 555 timer. The 555 timer in response, produces a timing pulse at a preselected time interval from a vertical synchronizing pulse. The length of the preselected time interval is directly related to an instantaneous voltage of the triangular wave form. The change in the time interval causes a paddle image to move back and forth, simulating a moving goalie.

It is a principal object of the present invention to provide a reliable circuit for generating a signal to move a goalie image to and fro in front of a goal mouth image on a playing screen of an electronic video game.

It is another object of this invention to provide a moving goalie circuit which acts as a free-running oscillator to start a moving goalie image at random positions in a playing field to provide for greater skill of play.

Other objects and uses of this invention will become obvious to one skilled in the art upon a perusal of the following specification and claims in light of the accompanying drawings.

DESCRIPTION OF THE PREFERRED EMBODIMENT

Figure 1:
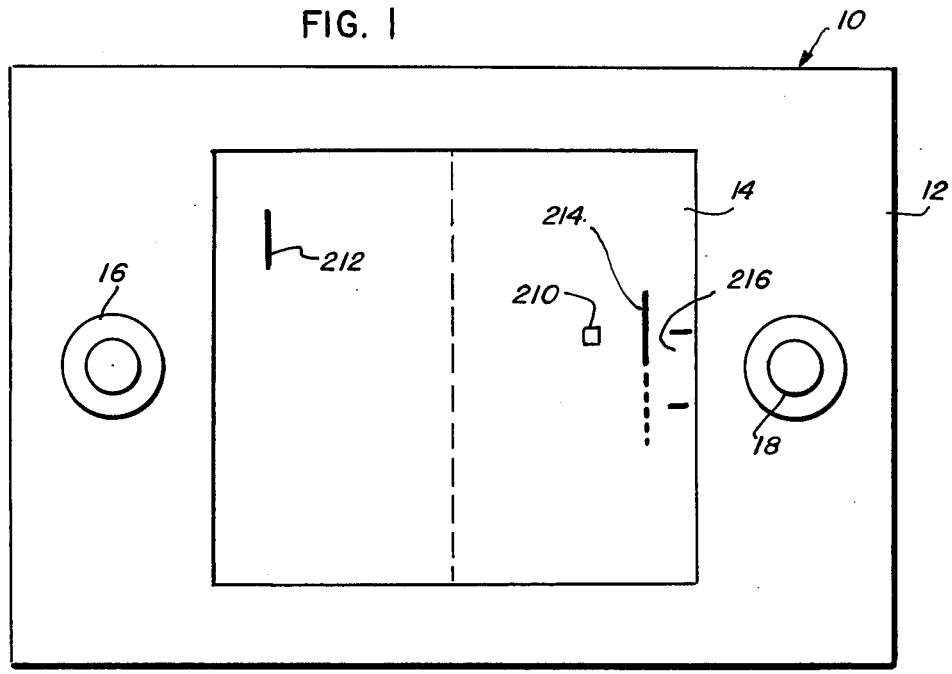
FIG. 1 is a top view of an electronic visual game, showing a playing field and a screen.
Figure 2:
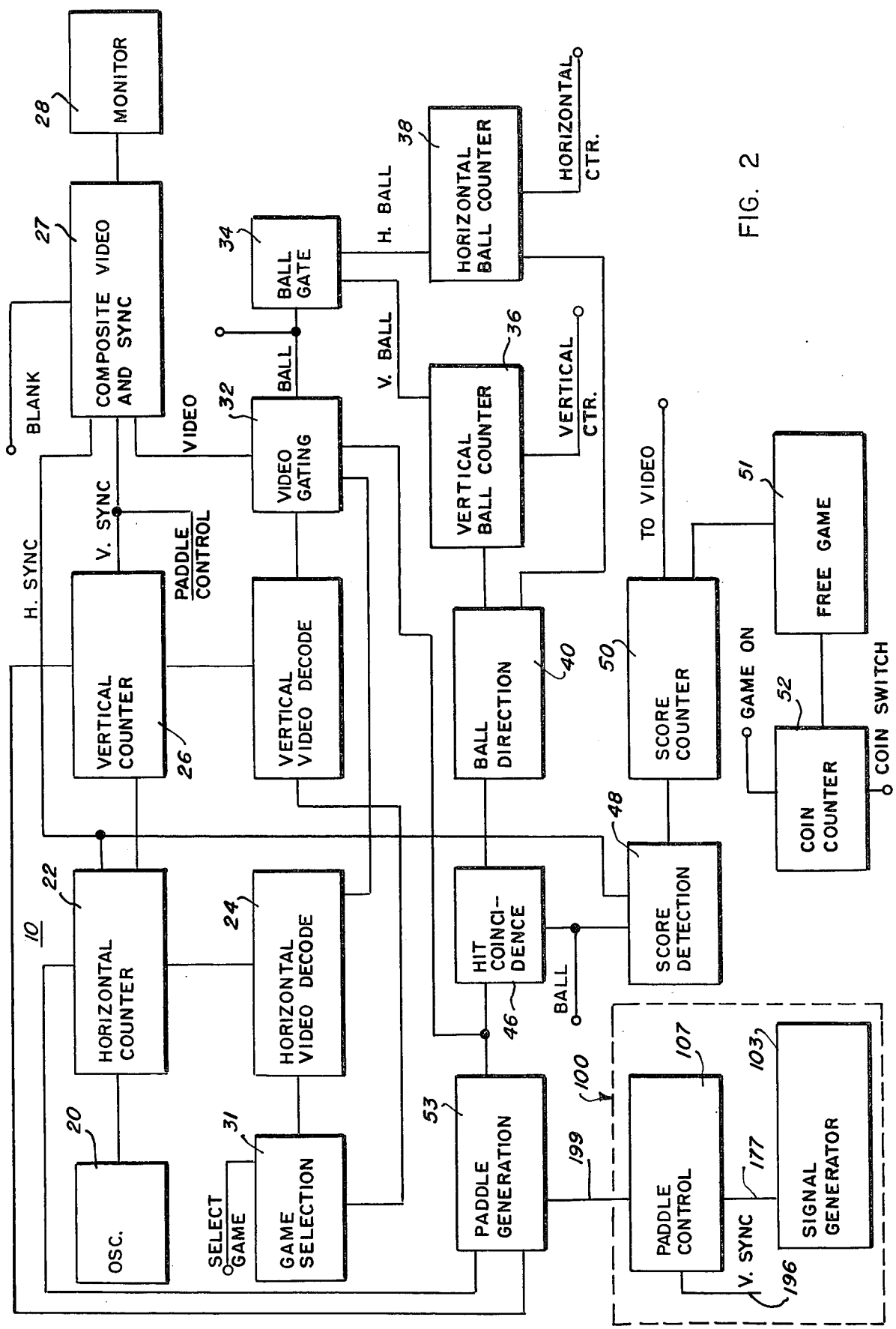
FIG. 2 is a block diagram of the electronic visual game of FIG. 1, showing the interconnection between the electronic visual game and a moving goalie circuit embodying the present invention.

Referring now to the drawings, and especially to FIGS. 1 and 2, an electronic visual game generally indicated by numeral 10, is shown therein. A block diagram is employed in FIG. 2 because the physical construction of electronic visual games is well-known.

Electronic visual game 10 includes a console 12 in which is mounted a playing screen 14. A pair of play controls, respectively numbered 16 and 18, is mounted on opposite sides of playing screen 14.

Circuitry of electronic visual game 10 is conventional. A local oscillator is connected to a horizontal counter 22. Horizontal counter 22 is connected to a horizontal video decoder 24, a vertical counter 26, and a composite video and sync system 27. Composite video and sync system 27 is connected to a standard television monitor 28. Standard television monitor 28 includes playing screen 14. Vertical counter 26 is connected to a vertical video decoder 29. Horizontal video decoder 24 is connected to a game selection circuit 31. Game selection circuit 31 and horizontal video decoder 24, and composite video and sync system 27, are all connected to a video gating circuit 32. Video gating circuit 32, in turn, is connected to the composite video and synchronizing circuit 27.

A ball gate 34 is connected to video gating circuit 32. A vertical ball counter 36 is connected between the vertical counter 26 and ball gate 34. A horizontal ball counter 38 is connected between horizontal counter 22 and ball gate 34. A ball direction circuit 40 is connected to both vertical ball counter 36 and horizontal ball counter 38. The ball direction circuit 40 is connected to a hit coincidence circuit 46. Hit coincidence circuit 46 is, in turn, connected between ball gate 34 and video gating circuit 32; and is also connected to a score detection circuit 48.

Score detection circuit 48 is connected to a score counter display 50. Score counter display 50 is connected to the video line between the video gating circuit 32 and the composite video and synchronizing display circuit 27. A free game circuit 51 is connected to score counter 50. A coin counter 52 is connected to free game circuit 51. A paddle generator 53 is connected to the hit coincidence circuit 46. Paddle generator 53 is connected to horizontal counter 22 and vertical counter 26.

Figure 3:
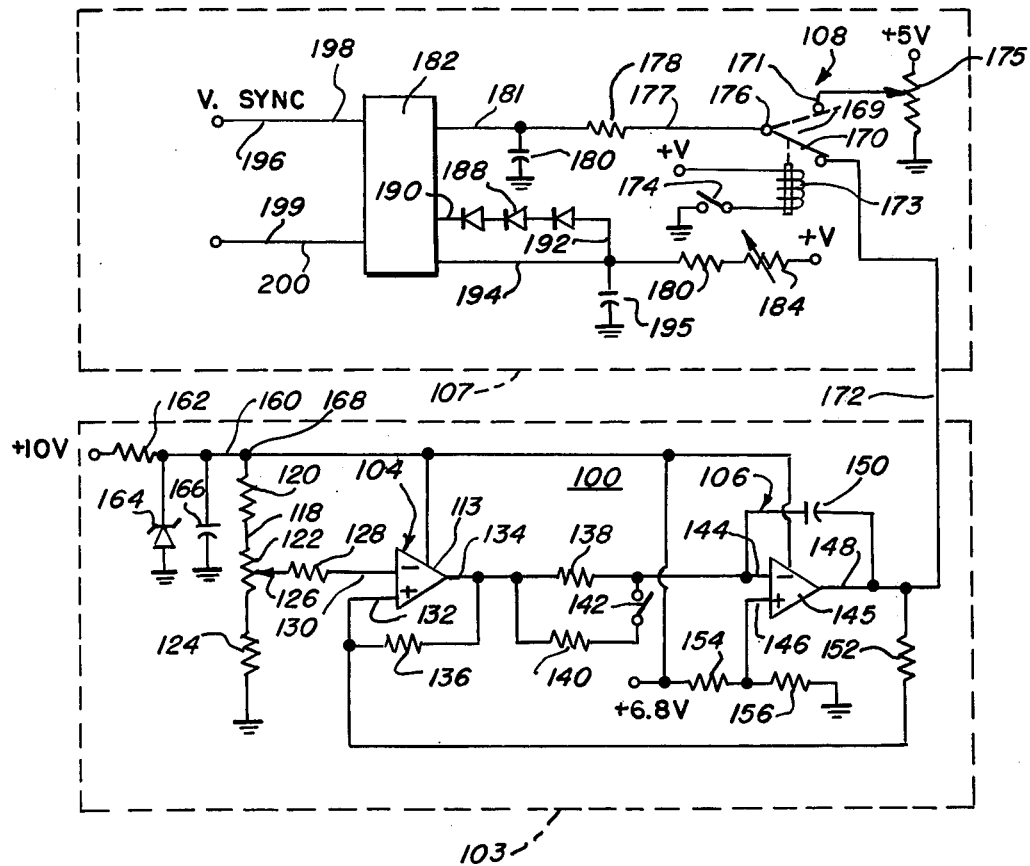
FIG. 3 is a schematic diagram of the moving goalie circuit of FIG. 2.

Referring now to FIG. 3, an inventive moving cursor circuit 100 is connected to paddle generator 53. Moving cursor circuit 100 has a repetitive signal generator 103. Repetitive signal generator 103 has a first operational amplifier stage 104, which is also a means for generating a square wave. A second operational amplifier stage 106 is connected to the first operational amplifier stage 104. Second operational amplifier stage 106 is also an integrator. A time signal generator 107 is connected to second operational amplifier stage 106 through a gating circuit 108. Time signal generator 107 is also a position control for a cursor image or paddle control.

First operational amplifier stage 104 includes a first operational amplifier 113, which is a conventional 741 operational amplifier, connected to a resistance network 118. Resistance network 118 includes a first 1 kilohm resistor 120, a 1 kilohm potentiometer 122 is connected in series with resistor 120 and a third 1 kilohm resistor 124 is connected in series with resistor 120 and potentiometer 122. Potentiometer 122 also has a movable tap 126. A 10 kilohm resistor 128 is connected to movable tap 126. 10 kilohm resistor 128 is, in turn, connected to an inverting input terminal 130 of operational amplifier 113. Operational amplifer 113 has a second non-inverting input terminal 132 and an output terminal 134. A 33 kilohm resistor 136 is connected between output terminal 134 and input terminal 132 of operational amplifier 113. An 82 kilohm resistor 138 and a 51 kilohm resistor 140 are selectively connectable in parallel by a switch 142 connected therebetween. Resistors 138 and 140 are connected to output terminal 134 of operational amplifier 113.

Resistors 138 and 140 are connected to second operational amplifier stage 106. Resistors 138 and 140 are connected to an inverting input terminal 144 of an operational amplifier 145. Operational amplifier 145 has a second non-inverting input terminal 146 and an output terminal 148. A 47 microfarad capacitor 150 is connected between input terminal 144 and output terminal 148 of operational amplifier 145. A resistor 152 is connected between output terminal 148 of operational amplifier 145 in a feedback loop to input terminal 132 of operational amplifier 113. A 1 kilohm resistance 154 is connected in parallel to a 1 kilohm resistance 156 between a 6.8 volt source and ground. A tap 158 is connected between resistors 154 and 156. Tap 158 is connected to input terminal 146 of operational amplifier 145.

Operational amplifiers 113 and 145 receive a 6.8 volt potential from a regulated voltage supply 160. Regulated voltage supply 160 is connected to a 10 volt source and has a 100 ohm resistance 162 connected in series with the voltage source. A 6.8 volt Zener diode 164 is connected with resistor 162 and to ground. A 100 microfarad capacitor 166 is connected in parallel with Zener diode 164 to ground. An output terminal 168 supplies the 6.8 volt potential to operational amplifiers 113 and 145.

Output terminal 148 of operational amplifier 145 is connected to gating circuit 108. A relay 169, having a center terminal 170, a first side terminal 171, a second side terminal 172 and a coil 173, is connected to a potentiometer 175 at first side terminal 171 and to output terminal 148 of operational amplifier 145 at second side terminal 172. Coil 173 is connected to a voltage source and to ground through a switch 174.

Center terminal 170 is connected through a lead 177 to a resistor 178 and a grounded capacitance 180 of time signal generator 107.

Resistance 178 and capacitance 180 is, in turn, connected to a control voltage terminal 181 of a 555 timer 182. A variable resistor 184 is connected to a fixed resistor and to a positive voltage source. Fixed resistor 186 is connected to a plurality of diodes 188. Plurality of diodes 188 is connected to a discharge terminal 190 of timer 182. A jumper 192 connects a junction between resistor 186 and diodes 188 to a threshold terminal 194 of timer 182. A 0.1 microfarad capacitor 195 connected threshold terminal 194 to ground. A lead 196 is connected to a trigger terminal 198 of timer 182. A lead 199 is connected to an output terminal 200 of timer 182. Lead 199 is connected to paddle generator 53.

In operation, oscillator 20 drives horizontal video decode circuit 24. Also, at intervals of 63.5 microseconds, horizontal counter 22 generates a sync pulse which is delivered to composite video and sync circuit 27. Horizontal video decode circuit 24, in turn, sends a signal to video gating circuit 32. Horizontal counter 22 also has a periodic output which drives vertical counter 26. Vertical counter 26 provides vertical synchronization to the composite video and synchronizer circuit 27. Vertical decoder 29 also receives a decoded count at periodic intervals from the vertical counter 26. Since the vertical counter is driven by counting signals of integral multiples supplied by the horizontal counter, the vertical counter runs at a much slower rate. The vertical video decode circuit 29, in turn, supplies a signal to video gating circuit 32. Horizontal counter 22 and vertical counter 26, in turn, drive horizontal ball counter 38, vertical ball counter 36, and paddle generator 52, respectively.

Horizontal ball counter 38 and vertical ball counter 36 control a ball gate 34. Output from ball gate 34 is fed into video gating circuit 32. Video gating circuit 32 thus receives a ball image signal from ball gate 34. In addition, horizontal and vertical ball counters 38 and 36 supply respective signals to a ball direction circuit 40. Ball direction circuit 40 supplies a signal to hit coincidence circuit 46 indicative of the position of a ball image. A ball or play image 210 is then displayed on playing screen 14.

Paddle generator 53 produces a paddle image 212 and a goalie image 214. Goalie image 214 is somewhat larger than paddle image 212 and extends the width of a goal mouth 216. Paddle generator 53 also supplies a signal to hit coincidence circuit 46. When the position of a paddle generated by paddle generator 53 and the ball image generated by ball direction circuit 40 coincidees, hit coincidence circuit 46 generates a signal which is fed into the video gating circuit 32. If there is no hit, coincidence circuit 46 supplies a signal to score detection circuit 48. Score counter 50 supplies a signal to the composite video and sync circuit 27. Score counter 50 generates an image of the score at that time between the two players. Score counter 50 supplies a score count to free game circuit 51 which allows a free game for preselected score differentials at the close of a particluar game.

The regulated voltage supply 160 supplies a 6.8 volt potential to operational amplifiers 113 and 145 for a driving voltage and also to resistance 120. The tap 126 of potentiometer resistance 122 picks off a potential between 2.26 and 4.58 volts which is fed to resistor 128. Resistor 128, in turn, feeds the potential to the inverting terminal 130 of operational amplifier 113. The voltage drives operational amplifier 113 into saturation. A high output voltage, the top of a square wave, is then fed through resistors 138 and 140 to inverting terminal 144 of operational amplifier 145. Operational amplifier 145 acts as an integrating amplifier and oscillator and supplies feedback back to the non-inverting terminal of amplifier 113. The capacitance 150 supplies the integrating function and generates triangular symmetrical wave form at output terminal 148. The potential from the triangular wave form is supplied to non-inverting terminal 132 of operational amplifier 113, generating a square wave output from operational amplifier 113 as operational amplifier 113 oscillates between two saturated states. If switch 142 is closed, the period of the triangular wave output from operational amplifier 145 decreases. The symmetrical triangular wave form has a maximum voltage of 5 volts and a minimum voltage of 0 volts.

When switch 174 is open, relay 169 is connected to potentiometer 175. Potentiometer 175 is also paddle control 18. Thus, when relay 169 is connected to potentiometer 172, the moving goalie feature is disabled and manual paddle control is enabled.

When switch 174 is closed, relay 179 connects operational amplifier stage 106 to paddle control 107. The symmetrical triangular wave form is then fed through relay 169 from operational amplifier stage 106 to paddle control 107. Any fast moving transients are filtered off through one microfarad capacitor 180 and a triangular wave potential is supplied directly to timer 182. Timer 182 produces a timing pulse a selected time after it receives a vertical synchronizing pulse through lead 196. The interval or time difference between the vertical sync pulse and the timing pulse is directly related to the instantaneous triangular wave potential. A stable comparison reference voltage which may be adjusted by variable resistor 184 is supplied to terminal 190 and 194 of timer 182. This interval controls the position of the goalie image 214 on the playing screen 14. Timer 182 thus controls the position of a paddle or goalie image supplied by conventional portions of other game circuitry. Thus, the effect of the varying voltage is similar to that produced by varying potentiometer tap position for potentiometer 175, thereby sweeping the goalie image 214 back and forth in front of the goal mouth 216. The length of sweep is relatively short, to avoid completely uncovering the goal mouth. It may be appreciated that since the only connection between moving goalie circuit 100 and other portions of the game circuit is through paddle control 107, moving goalie circuit 100 is basically a free-running oscillator. Therefore, a service of ball image 210 can occur when signal generator 103 is generating any potential between 0 and 5 volts, thus adding an element of chance to the positioning of the moving goalie 214 and the beginning of play. Furthermore, the position of the center of the goalie image excursions can be controlled by varying the setting of tap 126 of potentiometer 122. The rapidity of the goalie image excursions can also be increased or decreased by closing or opening switch 142 and thereby changing the time constant of integrator 106.

Although a specific embodiment of the moving goalie circuit for electronic visual games has been described in detail above, it is apparent that a man skilled in the art may make various modifications and changes in the instant inventive circuit without departing from the spirit and scope of the present invention. The present invention is, therefore, limited only by the appended claims.

What is claimed is:

1. A moving goalie circuit for use with electronic visual games, for causing a blocking cursor to move periodically back and forth across a playing screen of the electronic visual game, comprising: a repetitive signal generator, said repetitive signal generator generating a periodic reference control signal; a reference signal generator generating a periodic reference signal; and a position control connected to said repetitive signal generator and said reference signal generator, said position control receiving said periodic reference signal at a first time, said position control producing a timed signal at a second time, said first time and said second time being separated by a time difference, said time difference being proportional to an amplitude of said periodic signal; means defining an elongated fixed target area extending in a certain direction on the playing screen; and means responsive to said timed signal for controlling the movement of the cursor in a direction parallel to the first-mentioned direction to cause the cursor to move repetitively back and forth in said direction spaced from said fixed target area to block and expose alternatingly said target area.

2. A moving goalie circuit for use with electronic visual games, for causing a cursor to move periodically back and forth across a playing screen of the electronic visual game as defined in claim 1, in which said repetitive signal generator is a triangular wave generator.

3. A moving goalie circuit for use with electronic visual games, for causing a cursor to move periodically back and forth across a playing screen of the electronic visual game as defined in claim 1, in which said repetitive signal generator includes a first operational amplifier, said first operational amplifier producing a square wave.

4. A moving goalie circuit for use with electronic visual games, for causing a cursor to move periodically back and forth across a playing screen of the electronic visual game as defined in claim 3, in which a second operational amplifier is connected to said first operational amplifier, said second operational amplifier being an integrating amplifier and producing a triangular wave having substantially the same period as the square wave.

5. A moving goalie circuit for use with electronic visual games, for causing a cursor to move periodically back and forth across a playing screen of the electronic visual game as defined in claim 4, in which said second operational amplifier has an inverting terminal and an output terminal, a capacitor being connected between said inverting terminal and said output terminal, said capacitor performing an integrating function.

6. A moving goalie circuit for use with electronic visual games, for causing a cursor to move periodically back and forth across a playing screen of the electronic visual game as defined in claim 1, in which said repetitive signal generator includes a first operational amplifier having a first inverting terminal, a first non-inverting terminal and a first output terminal, said first inverting terminal being connected to a selected constant potential, said first output terminal being connected to a second operational amplifier, said second operational amplifier having a second inverting terminal, a second non-inverting terminal and a second output terminal, said second output terminal of said second operational amplifier being connected to a first resistor, said first resistor being connected to said first non-inverting terminal of said first operational amplifier, and a capacitor being connected to the second inverting terminal and the second output terminal of the second operational amplifier, said second operational amplifier producing a triangular wave.

7. A moving goalie circuit for use with electronic visual games as defined in claim 6, in which said signal generator includes a pair of parallel resistors connected between the first output terminal of said first operational amplifier and the second inverting input terminal of said second operational amplifier, said parallel resistors being connectable selectively in parallel by a switch, said switch, when closed, providing a shorter period for said triangular wave than when said switch is open.

8. A moving goalie circuit for use with electronic visual games, for causing a cursor to move periodically back and forth across a playing screen of the electronic visual game as defined in claim 1, in which said position control includes an integrated circuit timer, said integrated circuit timer having a first input terminal, a second input terminal, a third input terminal and an output terminal; said first input terminal receiving a reference voltage, said second input terminal receiving a variable voltage signal from said repetitive signal generator, said third input terminal receiving a reference timing pulse from other portions of a manually controlled electronic visual game, said output terminal yielding said timed pulse.

9. A moving goalie circuit for use with electronic visual games, for causing a cursor to move periodically back and forth across a playing screen of the electronic visual game, as defined in claim 8, in which said position control is selectively connectable to either said repetitive signal generator for automatic operation, or said potentiometer for manual operation.

10. A moving goalie circuit for use with electronic visual games for causing a cursor to move periodically back and forth across a playing screen of the electronic visual game comprising: a first operational amplifier having an inverting input terminal, a non-inverting input terminal and an output terminal, said inverting input terminal of said first operational amplifier being connected to a selected voltage source, said output terminal of said first operational amplifier being connected to a first resistor, said first resistor being connected to an inverting input terminal of a second operational amplifier, said second operational amplifier having a non-inverting input terminal and an output terminal, a capacitor connected from said inverting input terminal of said second operational amplifier to said output terminal of said second operational amplifier, a second resistor connected from said output terminal of said second operational amplifier to said non-inverting terminal of said first operational amplifier, said non-inverting input terminal of said second operational amplifier being connected to a second voltage source, said first operational amplifier being alternately driven in one of two saturated states to produce a square wave, said square wave being integrated by said second operational amplifier and said capacitor to produce a triangular wave, a portion of said triangular wave being fed back to said non-inverting terminal of said first operational amplifier to selectively switch said first operational amplifier output between said saturated states to produce said square wave; said second operational amplifier being connected to a relay, said relay opening and closing in response to a selected outside signal received from other portions of a manually controlled electronic visual game, said relay, when closed, being connected to an integrated circuit timer to supply a voltage reference level to said integrated circuit timer, said integrated circuit timer receiving a vertical synchronizing pulse from a vertical counter of said electronic visual game, said integrated circuit timer producing an output pulse a selected time interval away from said vertical synchronizing pulse, said selected time interval being proportional to the instantaneous amplitude of said triangular wave from said output pulse controlling a position of a cursor image displayed on said playing screen of said electronic visual game.

11. A moving goalie circuit for use with electronic visual games, for causing a blocking cursor to move periodically back and forth across a playing screen of the electronic visual game, comprising: a repetitive signal generator, said repetitive signal generator generating a periodic reference control signal; a reference signal generator generating a periodic reference signal; and a position control connected to said repetitive signal generator and said reference signal generator, said position control receiving said periodic reference signal at a first time, said position control producing a timed signal at a second time, said first time and said second time being separated by a time difference, said time difference being proportional to an amplitude of said periodic signal; said position control including an integrated circuit timer, said integrated circuit timer having a first input terminal, a second input terminal, a third input terminal and an output terminal; said first input terminal receiving a reference voltage, said second input terminal receiving a variable voltage signal from said repetitive signal generator, said third input terminal receiving a reference timing pulse from other portions of a manually controlled electronic visual game, said output terminal yielding said timed pulse; and a potentiometer is selectively connectable through a relay to said position control.

* * * * *